Figure 1:
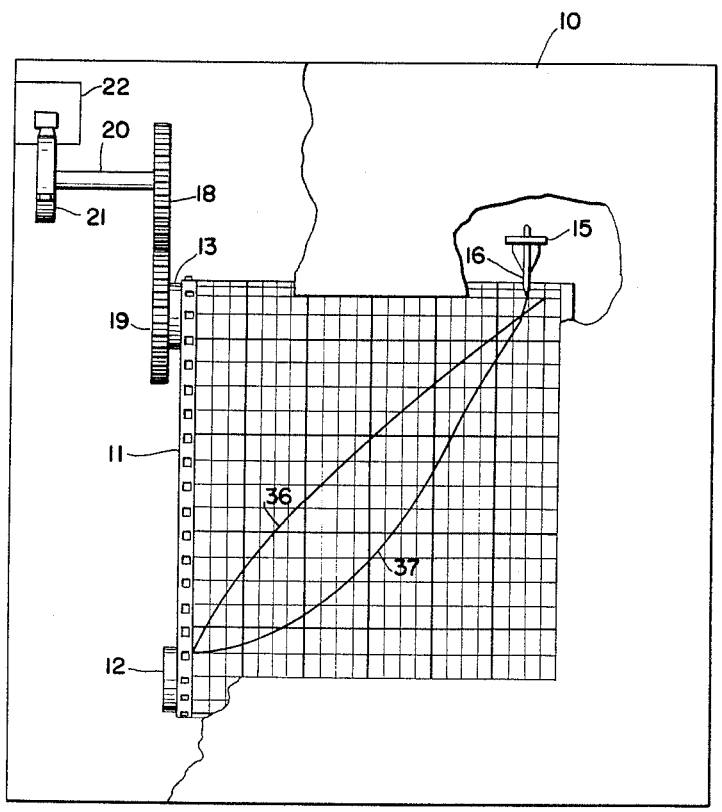

Dec. 8, 1964     R. D. OPPEL     3,160,465
RECORDING INSTRUMENT
Filed Jan. 23, 1963     2 Sheets-Sheet 2

United States Patent Office 3,160,465
Patented Dec. 8, 1964

3,160,465
RECORDING INSTRUMENT
Raymond D. Oppel, Waterbury, Conn., assignor to The Bristol Company, Waterbury, Conn., a corporation of Connecticut
Filed Jan. 23, 1963, Ser. No. 253,501
13 Claims. (Cl. 346—112)

This invention relates to a recording instrument and more particularly to that form of instrument wherein a pen or stylus borne by a movable arm deflecting with changes in a measured magnitude traces a graph on the surface of a driven paper chart.

In evaluating the results of a sequence of tests recorded in the form of graphs of one variable with respect to a mutually common variable such as time, it is often desired to compare the graphs directly one to another. Conventional recording techniques whereby the results of successive measurements are recorded in time-displaced relation along succeeding portions of a driven chart do not lend themselves to the carrying out of such direct comparisons. For example, in carrying out tensile elongation tests, the specimen to be tested is extended at a constant rate and an electronic signal is derived representative of the force in pounds to which the specimen is subjected at any instant. This signal is used to control the position of a recording pen with respect to a chart driven at a predetermined rate. In accordance with the present invention, the chart may be automatically returned to precisely the same starting position following each test with the result that a series of successive tests are recorded over the same length of chart and with respect to the same origin or zero point, thereby facilitating direct visual comparison of successively recorded curves.

It is, therefore, a principal object of this invention to provide an improved recording instrument which is reliable in operation and which is suitable for operation as desired to record the graphs of successive measurements in time-displaced relation along succeeding portions of a driven chart or to record successive graphs starting from the same zero or origin point to facilitate direct visual comparison.

In accordance with the present invention, electrical control means, as exemplified by relays, and switching means governed thereby are utilized to provide an accurate and efficient system. In accordance with a preferred embodiment of the present invention, means are provided for representing the extent of feed of the chart which advantageously provides a signal in the form of pulses each of which signals a predetermined extent of chart feed. Electrical control means and switching means governed thereby are connected with the chart feeding means and a counting means so that the signal pulses are added or subtracted in accordance with whether the chart is fed forward or backward. Upon termination of the forward feed of the chart, the chart is automatically returned to a back position behind the initial starting position determined by the number N of pulses representative of the extent of forward feed of the chart plus a predetermined number, one in the present instance, of additional pulses so that in the back position of the chart the point of origin of curves traced on the chart is spaced a distance behind the starting position corresponding to the difference between N and N′ where N′ is equal to the sum of N pulses and said additional pulses. When the chart arrives in said back position, electrical control means automatically operate to reverse the chart feed and restore the chart to its initial starting position. Means are also provided for preventing premature restoration of the control circuit to a condition representative of the chart in its starting position.

Figure 2:
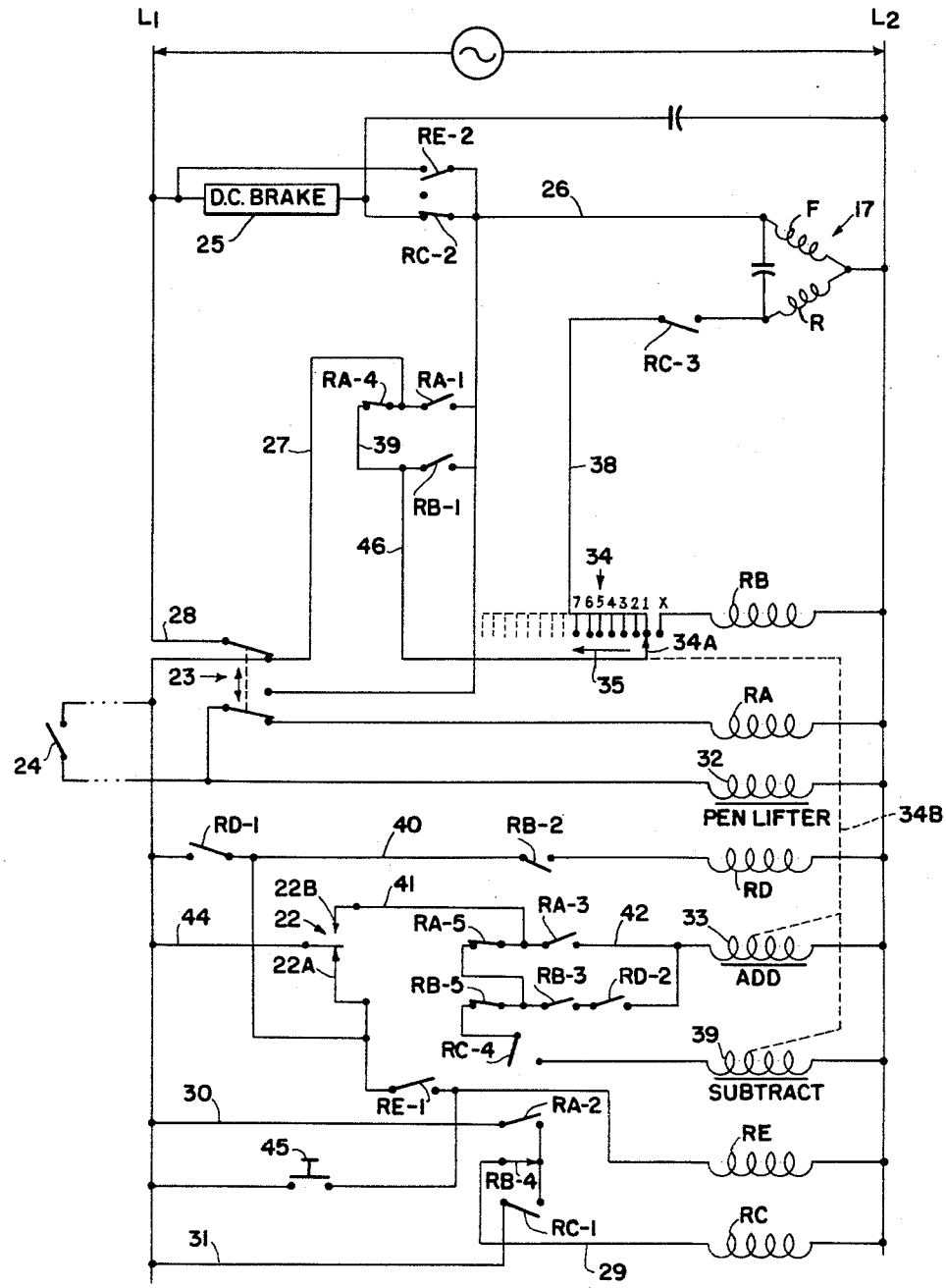

Further objects as well as advantages of the present invention will be apparent from the following description and the accompanying drawings, in which:

FIGURE 1 is an elevational view, partially cut away for convenience, of the chart mechanism of a recording instrument incorporating the present invention; and FIGURE 2 is a schematic diagram of a preferred embodiment of the chart drive homing system in accordance with the present invention.

The present invention will now be described in detail in connection with one form of recording instrument in which the rate of advance of the chart is solely time dependent. However, it is to be understood that the present invention is applicable to other recording instruments and is also applicable to arrangements in which the chart is driven not at a fixed relationship to time but in relation to some other variable.

Referring now to FIGURE 1, the recording instrument 10 may, as shown, comprise a strip chart 11, provided with perforations near one edge, which is carried by a supply roll, not shown, from which it is withdrawn by a driving roll 13 provided with spaced pins to engage the perforations on the edge of the paper and thus assure proper timing of the chart. After leaving the drive roll 13, the chart 11 is wound upon a receiving roll 12 operated through a yieldable friction train from the driving roll, so as to maintain a slight tension on the chart 11.

Such measuring and recording instruments which may incorporate a self-balancing potentiometer network for the purpose of continuously positioning the arm 15 carrying pen 16 with respect to the chart 11 while the latter is being driven at a predetermined rate are well known in the art and will not be further described here other than to the extent necessary to the full understanding of the present invention. As is also well known in the art, a signal representative of a measured magnitude is fed to the measuring and recording instrument which provides a graphic record thereof in suitable form on the driven chart. The present invention lends itself particularly well for use in recording graphs of the electrical signal generated by a transducer such as a strain gauge used in carrying out tensile elongation tests. Exemplary of such apparatus is the Scott Tensile Elongation Tester manufactured by Scott Testers, Inc. of Providence, Rhode Island, in which a specimen is extended at a constant rate and an electronic signal is derived from a strain gauge representative of the force in pounds to which the specimen is subjected. This signal is used to cause the pen 16 to move horizontally (as viewed in FIGURE 1) across the chart 11.

Drive roll 13 is driven through a suitable gear train (not shown) by a reversible synchronous motor 17 (FIGURE 2) in the conventional way. When the motor 17 is driven in its forward direction, drive roll 13 withdraws chart 11 from the supply roll and feeds it to the receiving roll 12 upon which it is wound. On the other hand, when the motor 17 is driven in its reverse direction, drive roll 13 withdraws chart 11 from the receiving roll 12 and returns it to the supply roll where it is rewound for further use. Thus, depending upon whether motor 17 is being driven forward or in reverse, the receiving roll or the supply roll is driven by the drive roll to take up the fed portion of the chart. It is to be understood that both the receiving and the supply rolls are each linked through similar yieldable drive connections with the drive roll.

For a purpose to be more fully described hereinbelow, an idler gear 18 meshes with a gear wheel 19 carried by the drive roll 13. The idler gear 18 is fixed to a shaft 20 to which in turn is fixed a cam wheel 21 juxtaposed to the contact arm of a single pole double throw microswitch 22.

As shown in FIGURE 2, a double pole, double throw switch 23 is provided to replace the usual "off"-"on" control switch for the motor 17. With the unit connected to the supply lines $L_1$ and $L_2$ as shown but with switch 23 shifted to its alternate position, the forward winding F of motor 17 is connected through switch 23 across the power supply by simply closing switch 24, whereby the chart 11 is continuously driven forward (downward as viewed in FIGURE 1) in the conventional manner at a speed determined by preselected gear ratios inserted in the drive train between motor 17 and roll 13. When it is desired that chart 11 return to its starting or home position between successive recordings, switch 23 is kept in the position shown whereby the forward winding of motor 17 is connected in series with a D.C. brake 25 indicated diagrammatically and, with switch 24 open, the chart drive roll 13 is held locked against motion.

Now, when switch 24, which may be placed at any convenient location, is closed, a circuit is completed energizing relay RA which picks up its front contacts RA–1, 2, 3 and opens its back contacts RA–4, 5. The closing of contacts RA–1 completes a circuit for the forward winding of motor 17 which bypasses the D.C. brake. This path may be traced from supply line $L_2$ through the forward winding F, lead 26, contacts RA–1, lead 27, the now closed contacts of switch 23 and lead 28 to supply line $L_1$.

For convenience in reading the schematic diagram of FIGURE 2, the contacts associated with the various relays have been included at the points in the circuit wherein they operate rather than adjacent the relay coils. The contacts are designated with the same reference letter or letters employed for the associated relay coil and the different contacts associated with the same relay coil have been provided with a numeral suffix to differentiate one from the other. Furthermore, the relays are all shown in their normal, unenergized condition with their front contacts open and their back contacts closed.

The closing of contacts RA–2 serves to energize a relay RC connected on one side to supply line $L_2$ and having its opposite side connected through lead 29, normally closed contacts RB–4 (relay RB now de-energized as will be pointed out hereinbelow), contacts RA–2, lead 30 to supply line $L_1$. With its front contacts RC–1 now closed and connected in series with contacts RB–4 to lead 31, relay RC is rendered independent of further operation of relay RA.

It is also to be noted that upon closing of contacts RA–3, a circuit is completed between contact 22B of the microswitch 22 through lead 41, contacts RA–3 and lead 42 to the add or forward-driving solenoid 33 of a stepping switch 34 connected by the link 34B as indicated. Each time solenoid 33 is energized, as will be described, switch arm 34A is advanced successively along the stepping switch contacts 1–7 in the direction of arrow 35. The stepping switch contacts may be seven in number as shown or more or less as desired and all are connected by lead 38 through contacts RC–3 to one side of the reversing winding R of motor 17. In addition to contacts 1–7, switch 34 has a contact X which, unlike contacts 1–7, is not connected to lead 38 but is connected to one side of relay RB, the other side of which is connected to supply line $L_2$.

A subtract or reverse stepping solenoid 39 is connected between supply line $L_2$ and front contacts RC–4 of relay RC. The subtract solenoid 39 is also connected by a suitable link as indicated at 34B to the arm of stepping switch 34 so arranged that each time solenoid 39 is energized, the switch arm 34A is shifted back one step to the right (as viewed). Energization of relay RC also serves to hold the D.C. brake 25 de-energized by the opening of its back contacts RC–2.

As was pointed out, the forward winding F of motor 17 is energized when switch 24 is closed and the drive roll 13 is rotated to advance the chart 11 past the pen 16. It is to be noted that upon the closing of switch 24, a solenoid 32 is energized to drop the pen into its writing position. As the chart advances, the cam wheel 21 rotates and periodically engages switch 22 to shift its arm from its normally closed contact 22A to its contact 22B thus completing the circuit through the now closed contacts RA–3 to provide pulses which periodically energize the solenoid 33 and advance the stepping switch arm 34A to the left in the direction of arrow 35. Cam wheel 21 may carry any desired number of cam lobes and, as shown, carries three cam surfaces spaced 120° apart. Thus, for every revolution of the drive roll 13, the microswitch 22 is actuated three times to provide three pulses and solenoid 33 is correspondingly actuated to add these pulses by shifting the switch arm 34A three steps in the direction of the arrow 35. Thus, the position of the arm of the stepping switch 34 closely follows the extent of rotation of the drive roll 13 and thereby the extent to which the chart 11 has been advanced from its starting position.

During the advance of the chart 11, a graph 36 is traced on the chart by the pen 16. Upon completion of the desired measurement, the switch 24 is opened thereby de-energizing the solenoid 32 and permitting pen arm 15 to be raised away from the chart 11. The apparatus is now in condition for the return of the chart to its position at the start of the measurement just carried out so that a second graph 37 representative of the results of a second measurement may be drawn over the same expanse of the chart and with respect to the same zero point.

Relay RA is now de-energized but relay RC remains energized through the normally closed back contacts RB–4 and its own front contacts RC–1. Thus, the brake 25 is held de-energized by the open back contacts RC–2 of relay RC.

The forward winding of motor 17 is de-energized by the opening of contacts RA–1 and a circuit is now completed to the reverse winding R of the motor through the now closed contacts RC–3, lead 38, stepping switch 34 and its movable contact arm 34A, lead 46, the now closed back contacts RA–4 and lead 27, connected through switch 23 and lead 28 to supply line $L_1$. The motor 17 with its winding R energized drives the roll 13 in reverse direction and as this rotation continues, the cam wheel 21 again shifts the microswitch 22 to close its contacts 22B and provide pulses in step with predetermined increments of rotation of roll 13. With relays RA and RB de-energized and relay RC energized, contact 22B is connected through a series of three contacts to one side of subtract solenoid 39 and the other side of which is connected to supply line $L_2$. These three contacts comprise the closed back contacts RA–5 and RB–5 and front contacts RC–4. Thus, a circuit is completed to the subtract solenoid 39 of the stepping switch 34 each time the microswitch 22 is shifted to close its contacts 22B and provide a pulse. As the reverse rotation of the drive roll 13 continues, the chart 11 is rewound upon the supply roll and solenoid 39 is correspondingly actuated to subtract the pulses by shifting the switch arm 34A in the direction opposite to arrow 35.

As has been pointed out hereinabove, the chart drive roll 13 and the chart 11 engaged thereby are in their home or starting positions when the arm of stepping switch 34 is on its contact 1. Stepping switch contact 1 is the last of the contacts connected through lead 38 to motor reverse winding R to be engaged by the arm of the switch 34 in its excursion to the right as viewed in FIGURE 2 under the influence of subtract solenoid 39. Assuming that N pulses were received from switch 22 during the forward advance of the chart, it is evident that the stepping switch arm 34A is returned to its contact 1 upon receipt of N pulses during reverse feeding of the chart. Upon the arrival of the stepping switch arm on its contact 1, the reverse winding remains energized and continues to rotate roll 13 in its reverse direction until cam wheel 21 once again actuates switch 22 to close its contacts 22B to provide an additional pulse bringing the total switches of pulses generated during reverse feed of the chart to N+1 or N' in number. Whereupon subtract solenoid 39 is once again energized to shift the stepping switch arm 34A from contact 1 to contact X. As the arm of switch 34 leaves contact 1, the motor reverse winding R is de-energized and when the switch arm comes to rest on contact X, relay RB is energized to pick up its front contacts RB–1, 2 and 3 and to open its back contacts RB–4 and 5. Closing of contacts RB–1 serves to shunt both open contacts RA–1 and brake 25 and the forward winding F of motor 17 is energized to drive roll 13 and cam 21 forward.

With rotation of roll 13, the arm of switch 22 returns to close its contacts 22A whereupon relay RD is energized through a circuit which is traced through contacts RB–2, lead 40, microswitch contacts 22A, the switch arm and lead 44, to supply line $L_1$. Front contacts RD–1 now close to provide a direct connection between lead 40 and supply line $L_1$ so that the relay RD remains energized event though the arm of switch 22 may be moved off of its contacts 22A thereby preventing premature opening of contacts RD–2 as will be more fully pointed out.

With energization of relay RB, its back contacts RB–4 open in the circuit of relay RC to cause the latter to drop out, closing contacts RC–2 to place the brake 25 in condition for operation when the contacts RB–1 should open. Contacts RD–2, RB–3 and RA–5 are closed and connected in series between add solenoid 33 and microswitch contacts 22B. Thus, as roll 13 continues to rotate, the cam wheel 21 once again actuates switch 22 closing its contacts 22B to energize the solenoid. Solenoid 33 steps arm 34A from contact X to contact 1 whereupon relay RB immediately drops out opening its contacts RB–1 to de-energize motor winding F and brake 25 halts rotation of roll 13. At the same time, contacts RB–2 open to de-energize relay RD and the latter's contacts RD–1 also open to lock out relay RD. Similarly, contacts RB–3 open and contacts RB–4, 5 are now closed.

The apparatus is now restored to the condition shown in FIGURE 2 with the chart 11 braked and in readiness for repeated operation as has been described so that succeeding graphs may be traced over the same expanse of the chart. For convenience, the chart 11 is shown in FIGURE 1 at the completion of the tracing of curve 37 and before it has been returned to its starting position.

It is to be noted that following the energization of relay RB when stepping switch arm 34A first arrives at its contacts X, the relay RB remains energized until the forward motion of the chart under the influence of motor 17 is completed as is signaled by the shifting of microswitch 22 by the cam wheel 21. The contacts RD–1 prevent premature de-energization of relay RD and opening of its contacts RD–2 in the time interval required for microswitch 22 to shift its arm from its contacts 22A to its contacts 22B. As shown, de-energization of relay RD is controlled by de-energization of relay RB which in turn results from movement of the stepping switch arm 34A from contact X under the influence of solenoid 33. Thus, it is assured that the apparatus comes to rest with both the chart and the stepping switch in their home positions.

A manually operated switch 45 is connected in series with a relay RE across the supply lines $L_1$–$L_2$ to provide for energization of the chart drive at will. The switch 45 is shunted by the normally open contacts RE–1, the arm of the microswitch 22 against its contacts 22A and lead 44. Thus, once switch 45 is momentarily held closed, the relay RE locks itself in through its contacts RE–1 and closes its contacts RE–2 in shunt with the D.C. brake 25 thereby completing an energizing circuit for the motor winding F. The motor 17 when thus energized drives the chart forward until the cam wheel shifts the arm of microswitch 22 to open the contacts 22A whereupon the relay RE drops out, de-energizing the motor winding F by opening its contacts RE–2 and locking itself out by opening its contacts RE–1.

An important advantage of the present invention resides in the high degree of accuracy with which the chart is repeatedly returned to its starting position. The over travel in the reverse direction represented by contact X of the stepping switch and the forward motion of the chart drive represented by the step from contact X to contact 1 of the stepping switch ensures positive positioning of such parts in the drive train as gears, sprockets, etc. whereby accuracy to within a few thousandths of an inch is consistently attained. Stated another way, after the chart is advanced a distance corresponding to N pulses from switch 22 and switch 24 is opened, the chart is fed in the reverse direction a distance corresponding to N' pulses where N' is greater than N, and then the chart is once again fed forward a distance corresponding to the difference between N and N' and is restored to its starting position.

The terms and expressions which have been employed are used as terms of description and not of limitation, and there is no intention, in the use of such terms and expressions of excluding any equivalents of the features shown and described or portions thereof, but it is recognized that various modifications are possible within the scope of the invention claimed.

I claim:

1. In a recording instrument of the class in which an inscribing means in response to variations in a measured magnitude is deflected transverse to the direction in which a chart is fed past said inscribing means, feed means for advancing said chart relative to said inscribing means so that a point on said chart initially at a starting position is advanced therefrom, means for providing a representation of the extent of the advance of said point on said chart from said starting position, means responsive to termination of the advance of said chart for actuating said feed means to feed said chart a distance corresponding to said representation and an additional amount to a back position in which said point is displaced by a predetermined amount behind said starting position, and means responsive to the arrival of said chart in said back position for automatically advancing said chart to displace said point said predetermined amount to said starting position.

2. In a recording instrument of the class in which an inscribing means in response to variations in a measured magnitude is deflected transverse to the direction in which a chart is fed past said inscribing means, reversible feed means for advancing said chart relative to said inscribing means so that a point on said chart is advanced from said starting position, means for providing a representation of the extent of the advance of said point on said chart from said starting position, means responsive to termination of the advance of said chart for reversing said feed means and for feeding said chart backward to an extent corresponding to said representation plus a predetermined amount whereby said point on said chart following its forward advance from said starting position is displaced backward to a back position spaced said predetermined amount behind said starting position, and means responsive to completion of said backward feeding of said chart for automatically advancing said chart to displace said point from said back position to said starting position.

3. In a recording instrument of the class in which an inscribing means in response to variations in a measured magnitude is deflected transverse to the direction in which a chart is fed past said inscribing means, reversible feed means for advancing said chart along a path relative to said inscribing means so that a point on said chart initially at a starting position is advanced therefrom, a first current path for energizing said feed means to feed said chart forward, a second current path for energizing said feed means to feed said chart backward, first electrical control means and means for selectively actuating and de-actuating the same, first switching means holding said first current path open and responsive to actuation of said first electric control means for closing said first current path, second switching means responsive to said first electrical control means for holding said second current path open while said first electrical control means is actuated and for closing said second current path upon deactuation of said first electrical control means, means for providing electrical pulses during feeding of said chart such that each pulse is representative of a predetermined extent of feed of said chart, second electrical control means, means responsive to N number of pulses representative of the extent of forward feed of said chart for opening said second current path following receipt of N' pulses, N' being larger than N, during backward feed of said chart and for actuating said second electrical control means, third switching means responsive to actuation of said second electrical control means for shunting said first switching means to close said first current path, and said pulse-responsive means being adapted to de-actuate said second electrical control means following actuation of the latter in response to further pulses equal in number to the difference between N and N', whereby said point on said chart upon completion of the forward feed of said chart from said starting position is fed to a back position with said point spaced a predetermined distance behind said starting position and is then shifted to said starting position.

4. Apparatus as set forth in claim 3, comprising third electrical control means actuated in response to actuation of said first electrical control means while said second electrical control means is de-actuated, means governed by said third electrical control means for mintaining the same actuated independent of the condition of said first electrical control means following actuation of the latter, means governed by said second electrical control means for de-actuating said third electrical control means, and means governed by said third electrical control means for holding said second current path open when said third electrical control means is de-actuated.

5. Apparatus as set forth in claim 4, comprising means for braking said feed means when both said first and second electrical control means are de-actuated, said braking means comprising electrically responsive brake means and fourth switching means mutually connected in series and connected to said first current path in parallel with said first and third switching means, and said fourth switching means in response to actuation of said first electrical control means holding said brake means de-actuated and in response to actuation of said second electrical control means holding said brake means actuated.

6. Apparatus as set forth in claim 5, wherein said fourth switching means is governed by said third electrical control means to hold said electrically responsive brake means de-actuated when said third electrical control means is actuated.

7. Apparatus as set forth in claim 3, wherein said feed means includes a feed member and means for coupling the same with said chart so that a predetermined motion of said feed member corresponds to a predetermined feed of said chart, and said pulsing means includes switching means coupled with said feed member for actuation by the latter.

8. Apparatus as set forth in claim 3, comprising means responsive to said second electrical control means and said pulsing means for preventing de-actuation of said second electrical control means until after the termination of all but the last one of said pulses.

9. In a recording instrument of the class in which an inscribing means in response to variations in a measured magnitude is deflected transverse to the direction in which a chart is fed past said inscribing means, reversible feed means for advancing said chart relative to said inscribing means so that a point on said chart initially at a starting position is advanced therefrom, a first current path for energizing said feed means to feed said chart forward, a second current path for energizing said feed means to feed said chart backward, first relay means and means for selectively energizing and de-energizing the same, first switching means holding said first current path open and responsive to energization of said first relay means for closing said first current path, second switching means governed by said first relay means for holding said second current path open while said first relay means is energized and for closing said second current path upon de-energization of said first relay means, means for providing electrical pulses during feeding of said chart such that each pulse is representative of a predetermined extent of feed of said chart, stepping switch means having an initial position corresponding to said starting position, counting means responsive to said pulses for actuating said stepping switch means step-by-step in one direction in response to pulses corresponding to forward feed of said chart and for actuating said stepping switch means in its other direction in response to pulses corresponding to backward feed of said chart, said stepping switch means being connected in said second current path so as to open the latter when it is stepped in its said opposite direction to a further position, second relay means connected for energization when said stepping switch means is in its further position, third switching means governed by said second relay means for shunting said first switching means to close said first current path when said second relay means is energized, said counting means in response to a further pulse received when said stepping switch means is in its further position being actuated to step said stepping switch means to its initial position and thereby de-energize said second relay means, whereby said point on said chart upon completion of the forward feed of said chart from said starting position and de-energization of said first relay means is fed to a back position corresponding to said further position of said stepping switch means with said point spaced a predetermined distance behind said starting position and is then shifted to said starting position.

10. Apparatus as set forth in claim 9, wherein said pulsing means includes a switch means governed by said feed means, said counting means including switch means coupling the same with said pulsing means and governed by said first and second relay means so that said stepping switch means is stepped in said one direction when said first relay means is energized and said second relay means is de-energized and said stepping switch means is stepped in said opposite direction when both said first and second relays are de-energized, and said counting means including further switching means for stepping said stepping switch means from said further position to said initial position upon energization of said second relay means.

11. Apparatus as set forth in claim 9, comprising third relay means, means governed by said first and second relay means for energizing said third relay means when said first relay means is energized and said second relay means is de-energized, means governed by said third relay means for rendering said third relay means independent of the condition of said first relay means, said pulsing means including a switch means governed by said feed means, said counting means including switch means coupling the same with said pulsing means and governed by said first, second and third relay means so that said stepping switch means is stepped in said one direction when said first relay means is energized and said second relay means is de-energized and said stepping switch means is stepped in said opposite direction when both said first and second relays are denergized and said third relay means is energized, and said counting means including further switching means for stepping said stepping switch means from said further position to said initial position upon energization of said second relay means.

12. Apparatus as set forth in claim 11, comprising a fourth relay means, said further switching means including means governed by said fourth relay means for preventing stepping of said stepping switch means from said further position to said initial position until said pulsing means signals the return of said chart to said starting position, and means governed by said second relay means and said pulse switching means controlling energization of said fourth relay means.

13. Apparatus as set forth in claim 9, comprising another relay means responsive to said second relay means and said pulsing means for preventing said counting means from advancing said stepping switch means from its further position to its initial position until after termination of the pulse next preceding said further pulse.

References Cited in the file of this patent

UNITED STATES PATENTS

| | | |
|---|---|---|
| 2,690,951 | Moore | Oct. 5, 1954 |
| 2,916,695 | Elarde | Dec. 8, 1959 |
| 3,060,430 | Paschkis | Oct. 23, 1962 |